(12) United States Patent
Radcliffe

(10) Patent No.: US 6,955,508 B1
(45) Date of Patent: Oct. 18, 2005

(54) APPARATUS AND METHOD FOR SEPARATELY BORING PRECISELY ALIGNED OPPOSING SCREW HOLES IN INDIVIDUAL FRAME MEMBERS TO BE JOINED AT A MITER JOINT

(76) Inventor: Gregory P. Radcliffe, 5437 Marie Rd., Oregon, WI (US) 53575

( * ) Notice: Subject to any disclaimer, the term of this patent is extended or adjusted under 35 U.S.C. 154(b) by 476 days.

(21) Appl. No.: 10/304,515

(22) Filed: Nov. 26, 2002

(51) Int. Cl.$^7$ ............................................. B23B 39/16
(52) U.S. Cl. ........................... 408/37; 408/1 R; 408/14
(58) Field of Search .......................... 144/2.1, 3.1, 365, 144/371, 367; 408/1 R, 7, 10, 12, 14, 15, 408/37, 36, 67, 95, 103, 241 G

(56) References Cited

U.S. PATENT DOCUMENTS

| | | | |
|---|---|---|---|
| 260,774 A | 7/1882 | Moyer | |
| 1,787,781 A * | 1/1931 | Galloway | 408/9 |
| 1,956,740 A | 5/1934 | Gress | |
| 2,449,429 A * | 9/1948 | Van Degrift et al. | 408/2 |
| 2,956,453 A * | 10/1960 | Frankenfield | 408/7 |
| 3,346,894 A * | 10/1967 | Lemelson | 408/12 |
| 3,496,974 A * | 2/1970 | Silvey et al. | 144/365 |
| 3,515,017 A * | 6/1970 | Ulrich | 408/103 |
| 4,080,089 A * | 3/1978 | Matsushima | 408/2 |
| 4,212,570 A * | 7/1980 | Larsson | 408/95 |
| 4,419,031 A * | 12/1983 | Palma | 408/1 R |
| 4,576,213 A | 3/1986 | Miller | |
| 4,603,719 A | 8/1986 | Durney | |
| 4,749,013 A | 6/1988 | Ducate, Sr. | |
| 5,553,645 A | 9/1996 | Durney | |
| 5,769,574 A * | 6/1998 | Feinsod | 408/1 R |
| 6,142,196 A * | 11/2000 | Schumann et al. | 144/3.1 |
| 6,206,621 B1 * | 3/2001 | Sebring | 409/137 |
| 6,345,939 B1 * | 2/2002 | Poeting | 408/38 |

* cited by examiner

Primary Examiner—Derris H. Banks
Assistant Examiner—Jamila Williams
(74) Attorney, Agent, or Firm—Patricia Smith King

(57) ABSTRACT

An apparatus and method for separately boring precisely aligned opposing screw holes in individual frame members to be matingly joined at a miter joint. The apparatus comprises a first boring means for boring a first screw hole in the first frame member, a second boring means for boring a pilot screw hole in the second frame member, a carriage assembly on which the boring means are mounted and positioned relative to the miter-cut ends of the frame so that the separately bored first and pilot screw holes share a common centerline; and, a positioning means for supporting and precisely positioning the miter-cut end of the frame member in a repetitively consistent location to ensure that the first and pilot screw holes are identically located and aligned on each of the bored first and second frame members.

26 Claims, 7 Drawing Sheets

APPARATUS AND METHOD FOR SEPARATELY BORING PRECISELY ALIGNED OPPOSING SCREW HOLES IN INDIVIDUAL FRAME MEMBERS TO BE JOINED AT A MITER JOINT

CROSS-REFERENCES

Applicant requests that Disclosure Document no. 517706, filed at the U.S. Patent and Trademark Office on 2002 Sep. 3, be associated with this application.

STATEMENT REGARDING FEDERALLY SPONSORED RESEARCH OR DEVELOPMENT

Not applicable.

BACKGROUND

The present invention relates generally to an apparatus and method for boring screw holes in frame members, and particularly to an apparatus and method for boring screw holes in frame members individually so that the screw holes made in independently bored opposing frame members will align perfectly when the frame members are matingly joined at a miter joint.

The casings of interior windows and doors serve to frame them so as to impart an aesthetically pleasing appearance. When buildings are newly constructed or renovated with new doors and windows, their installation requires that casings be constructed to fit to their particular dimensions. Constructing custom-fit casings with strong and unobtrusive mitered joints requires skilled carpentry and is time-consuming. In today's construction market with an economic imperative to provide quality casings at minimal cost, there is a competitive advantage to reliably making high-quality casings that are pre-drilled for interchangeable assembly on site more quickly and with less skilled labor.

One of the difficulties in achieving this goal, however, is the coincident trend, similarly driven by the need to reduce costs, of making casings out of thinner and thinner pieces of wood. Even with previously used thicker casings, the making of mitered joints at the junction of two or more casing frame members to form the frame around a window or door is a difficult task. Wood is not uniform in quality, and moisture is uneven in cut wood. As a result, the wood of casings is subject to movement caused by changes in its moisture content. Such movement is a critical consideration in joint design. The object of the miter joint is to fix two casing frame members together so that the joint has the greatest possible mechanical strength and is as unobtrusive as possible. Most machine-made joints rely on a combination of mechanical fit and glue for their strength. Screwing two miter-cut casing frame members together to form the joint, greatly strengthens the joint and makes for a casing that will retain its shape for a much longer period of time than one that is simply glued and tacked in place. Miter joints reinforced with screws also enable stronger fittings around doors and windows that are not true.

However, with the thinner casing frames, the making of accurately positioned screw holes is a challenging task. The casing frames used today are generally less than half an inch thick at their thickest and may vary in thickness throughout their width depending on style. For this reason, it is not possible to screw two casing frame members together at a miter joint from the back of one member across the joint and into the other. There is insufficient thickness in the casing frame members to allow for a pilot hole of optimal length for a strong connection without its breaking the surface of the casing if drilled at an angle. Therefore, there is an advantage to placing screws from the edge of one casing frame member through the miter joint to a pilot hole in the mating casing frame member, since longer holes may be drilled lengthwise through a thinner casing than crosswise. To do so, however, requires that the holes be placed precisely so that they remain interior to the casing frame member at all points. This smaller allowable margin of error in situating the holes also requires that the holes be made true and straight, not veering with the grain of the wood, and by a means that prevents splitting of the thinner wood.

Prior attempts to provide a method of making screw holes in frames of other sorts are inadequate to the task and none provide means to quickly and efficiently bore screw holes in frame members independently of one another so that the screw holes will align properly across the miter joint. For example, most machines for drilling screw holes for use at a mitered joint, require that both frame members be positioned in place with the joint formed prior to drilling. This results in perfectly aligned screw holes across only the particular joint formed by those two specific frame members. They are the only ones that will align properly. Requiring that the frame members at each mitered joint be aligned prior to drilling is a time-consuming and labor-intensive task. It also results in individual frame members that are not interchangeable with one another. If damage occurs to one of the opposing frame members, it cannot simply be replaced with another, rather both opposing frame members must be replaced with others drilled in similar fashion.

Another difficulty with this method arises when frame members are lengthy. For example, positioning two casing members to form a miter joint, each of which potentially being 6 to 10 feet in length, is physically impractical.

Still another problem is that these other methods generally screw the hole from the back of the frame. As discussed above, this is not possible with the thinner frame members typically used to form casings. To bore screw holes in casing frame members, boring of the screw hole from the outer edge is required.

Information relevant to attempts to address the problems of drilling screw holes in frame members generally can be found in U.S. Pat. Nos. 5,769,574; 6,142,196; 5,553,645; 4,749,013; 4,603,719; 4,576,213; 3,496,974; 1,956,740 and 1,787,781. However, each one of these references suffers from one or more of the following disadvantages: (a) they situate the screw holes so that screws are placed from the back surface of a frame forward through the miter joint, not from the side of the frame as required with today's thin casing frames; (b) they use drilling devices that rotate at too slow a rate to ensure the making of holes that run true and do not veer with the grain of the wood, a requirement of critical importance with thinner casings; (c) they do not enable the making of holes rapidly and reliably enough to ensure cost-efficiency; (d) they require that both mating members of a frame be clamped in place prior to drilling in order to make mating holes perfectly aligned in each member (though the holes are only aligned for the two particular frame members), an inefficient method and a practical impossibility when working with casing frame members of long lengths in the range of 6 to 10 feet; and, (e) they do not enable the making of pocket- and pilot-holes separately in individual casing frame members such that the holes are precisely placed and aligned to enable a perfect mating at the miter joint and the interchangeability of casing frame members. None provide a means for producing framing members that may be used interchangeably to form miter joints at which their respective screw holes align perfectly.

For the foregoing reasons, there is a need for an apparatus and method for efficiently and cost-effectively making precisely positioned and aligned mating first and pilot screw holes in separate frame members so as to enable their interchangeability. There is still further a need for an apparatus and method to make the screw holes from the sides of narrow frame members with precision and speed in order to ensure a true trajectory through only the interior of the frame and to avoid splitting in frames made of wood.

SUMMARY

The present invention is directed to satisfying these needs by providing an apparatus and method for separately boring precisely aligned opposing screw holes in individual first and second frame members to be matingly joined at a miter joint. By employing this invention, individual first and second frame members may be efficiently prepared with consistently and precisely located and aligned opposing first and pilot screw holes to assure a perfect mating every time when any first frame member is joined with any second frame member at the miter joint, thus enabling the interchangeability of all first and all second frame members and eliminating the need to custom bore the first and pilot screw holes through two opposing frame members simultaneously.

Each frame member generally comprises a front, back, inner edge and outer edge surface, the inner and outer edge surfaces being substantially narrower than the front and back surfaces and the back surface being substantially flat, each frame member further consisting of two ends at least one of which is cut at an angle to the outer edge to form a miter-cut surface in acute angle to the outer edge surface at a corner where the two surfaces meet.

In one version, the apparatus comprises (a) a first boring means for boring a first screw hole in the miter-cut end of the first frame member; (b) a second boring means for boring a pilot screw hole in the miter-cut end of the second frame member; (c) a carriage assembly on which the first and second boring means are mounted and positioned relative to the miter-cut end of the first or second frame member so that the separately bored first and pilot screw holes share a common centerline to assure a precisely opposing location and a perpendicular alignment of the holes relative to the miter-cut surface when the first and second frame members are matingly joined at the miter joint; and, (d) positioning means connected to the carriage assembly for supporting and precisely positioning the miter-cut end of the individual first or second frame member in a repetitively consistent location relative to the corner and to the miter-cut surface of the frame member and to the first and second boring means to ensure that the first screw holes are identically located and aligned on each of the bored first frame members and that the pilot screw holes are identically located and aligned on each of the bored second frame members. In another version, the carriage assembly further consists of a moveable platform upon which the first and second boring means are mounted in opposing position and relative to the miter-cut surface of the first or second frame member so that the centerlines of the separately bored first and pilot screw holes are in precisely opposing location and in perpendicular alignment to the miter-cut surface when the first and second frame members are matingly joined at the miter joint; two guide rods; bearing assemblies connecting the platform to the guide rods, the bearings enabling the smooth movement of the platform along the linear path defined by the guide rods; and, a control handle.

In another version, the positioning means consists of a frame support connecting the positioning means to the guide rods of the carriage assembly, and on which the back surface of the first or second frame member is positioned; a clamp means for maintaining the alignment of the frame member during boring, the clamp means being mounted on a clamp plate attached to said frame support; guide means attached to the frame support and against which the outer edge of the frame member is positioned; a frame stop means mounted to and extending outwardly from the clamp plate and against which the first or second frame member is abutted once guided into position along the guide means so that the corner and the back surface of the first or second frame member is precisely located and the miter-cut surface is at a perpendicular orientation relative to the screw hole trajectory of the first or second boring means.

In another version, a method is provided for employing the apparatus described above.

These and other features and aspects of the apparatus and method will become better understood with reference to the following description, accompanying drawings, and appended claims.

Several objects and advantages of the present invention are: (a) to provide an apparatus and method by which precisely and consistently true and aligned mating first and pilot screw holes may be individually made in separate frame members so as to enable the interchangeability of mating frame members, to maximize the quality and cost-efficiency of their production and so as to eliminate the need to align frame members at a miter joint prior to boring the screw holes; (b) to provide an apparatus and method by which precisely located screw holes can be made in frame members of varying widths; (c) to provide an apparatus and method by which precisely located screw holes can be made efficiently in individual frame members of longer lengths, such as those used in making the casings for windows and doors, that cannot practically be mated at a miter joint prior to boring; (d) to provide an apparatus and method that is simple and reliable to use so that it can be used productively, cost-effectively and safely by relatively unskilled labor; (e) to provide a method that enables a user to rapidly and separately prepare multiple top, bottom and side frame members from which to choose later when wood color and grain must be matched prior to final assembly of mitered joints, in order to minimize overall time spent and to maximize the quality of product and profitability in today's construction industry; and, (f) to provide an apparatus and method for producing frame members off-site of construction that are capable of replacing frame members lost or damaged on-site without the need to use the opposing frame member(s).

The reader is advised that this summary is not meant to be exhaustive. Further features, aspects, and advantages of the present invention will become better understood with reference to the following description, accompanying drawings and appended claims. In particular, though the invention is described in its application to the boring of casing frame members, it may also be applied to other types of frames such as those used to frame paintings and the like.

BRIEF DESCRIPTION OF DRAWINGS

For a better understanding of the present invention, reference may be made to the accompanying drawings, in which.

DESCRIPTION

Figure 1A:
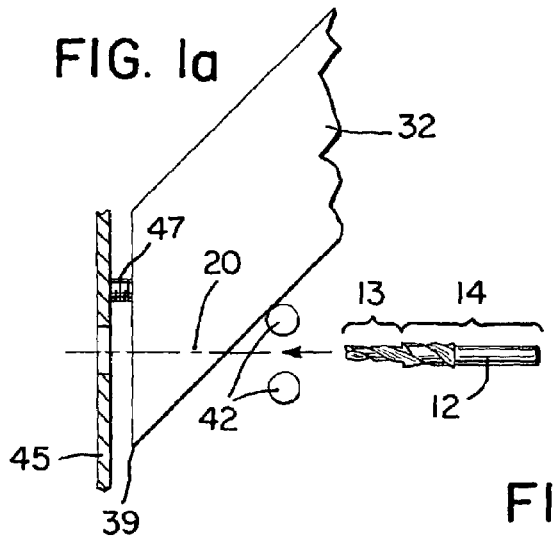
FIG. 1a, shows a side view of a first frame member positioned against guide means 42 and frame stop 47 in preparation for boring by a first boring means.

Referring now specifically to the figures, in which identical or similar parts are designated by the same reference numerals throughout, a detailed description of the present invention is given. It should be understood that the following detailed description relates to the best presently known embodiment of the invention. However, the present invention can assume numerous other embodiments, as will become apparent to those skilled in the art, without departing from the appended claims.

It should also be understood that, while the methods disclosed herein may be described and shown with reference to particular steps performed in a particular order, these steps may be combined, sub-divided, or re-ordered to form an equivalent method without departing from the teachings of the present invention. Accordingly, unless specifically indicated herein, the order and grouping of the steps is not a limitation of the present invention.

DETAILED DESCRIPTION—APPARATUS

Figure 1B:
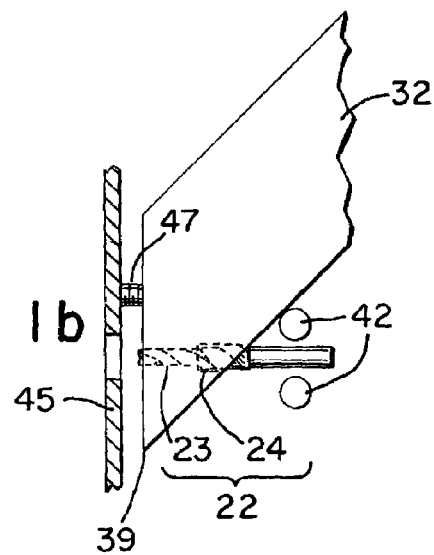
FIG. 1b, shows the side view of FIG. 1a after the first boring means has engaged the first frame member to bore a first screw hole.
Figure 1C:
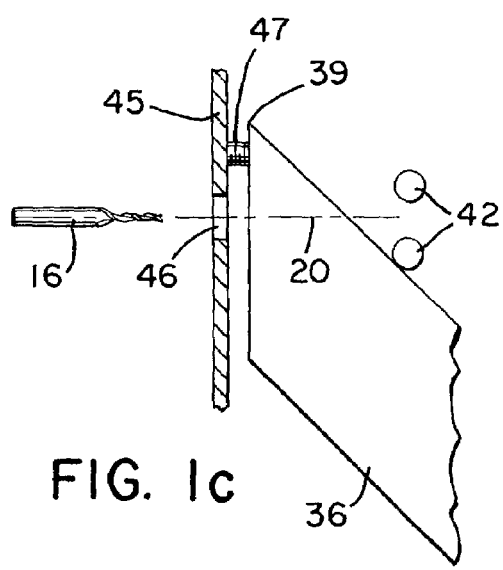
FIG. 1c, shows a side view of a second frame member positioned against guide means 42 and frame stop 47 in preparation for boring by a second boring means.
Figure 1D:
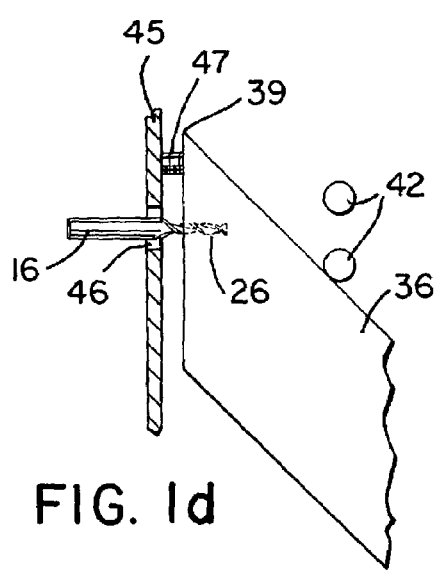
FIG. 1d, shows the side view of FIG. 1c after the second boring means has engaged the second frame member to bore a pilot screw hole.
Figure 2A:
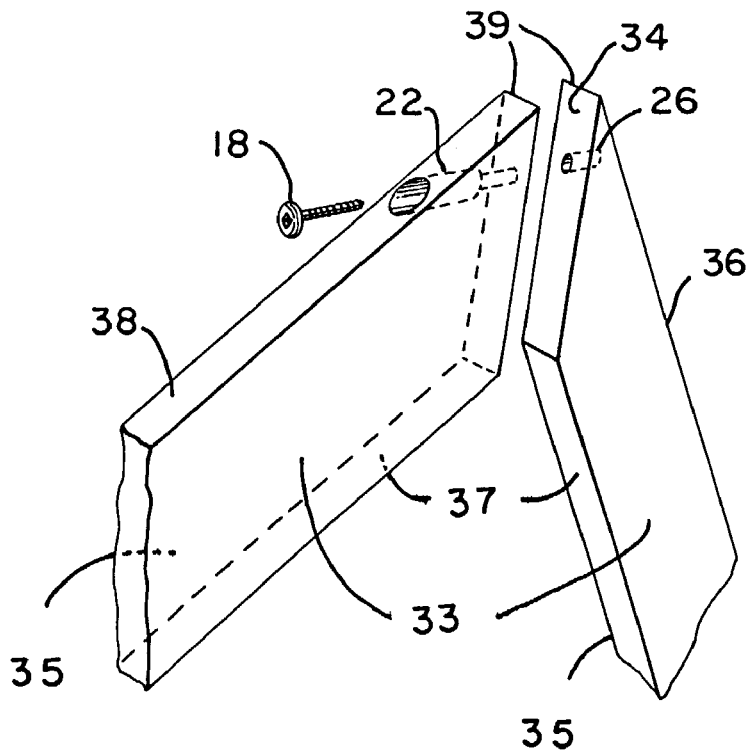
FIG. 2a, shows the first and second frame members after boring as they are positioned to form a miter joint.
Figure 2B:
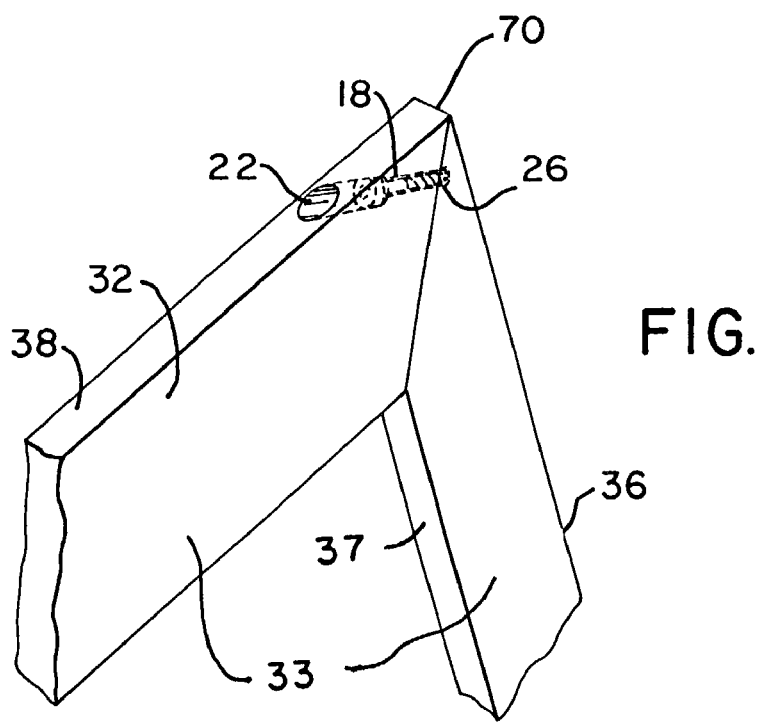
FIG. 2b, shows the frame members of FIG. 2a joined to reveal the perfect alignment of the first and pilot screw holes with a screw inserted therein.

Referring to FIGS. 1a to 1d, the apparatus of the present invention functions to separately bore precisely aligned opposing screw holes in individual first 32 and second 36 frame members to be matingly joined at a miter joint 70 (see FIG. 2b). The apparatus enables the frame members 32 or 36 to be efficiently prepared with consistently and precisely located and aligned opposing first and pilot screw holes (22 and 26) to assure a perfect mating when any first frame member 32 is joined with any second frame member 36 at the miter joint 70, thus enabling the interchangeability of all first and all second frame members 32 or 36 and eliminating the need to custom bore the first and pilot screw holes (22 and 26) through two opposing frame members simultaneously.

Referring also to FIGS. 2a and 2b, each frame member 32 or 36 to be bored comprises a front 33, back 35, inner edge 37 and outer edge 38 surface, the inner edge 37 and outer edge 38 surfaces being substantially narrower than the front 33 and back 35 surfaces, and the back surface 35 being substantially flat. Each frame member 32 or 36 further comprises two ends at least one of which is cut at an angle to the outer edge 38 to form a miter-cut surface 34 in acute angle to the outer edge surface 38 at a corner 39 where the two surfaces meet. Frame members 32 or 36 are generally made of wood, though other materials are sometimes used in the making of casings for windows and doors, picture frames and other similar frame structures.

Figure 3:
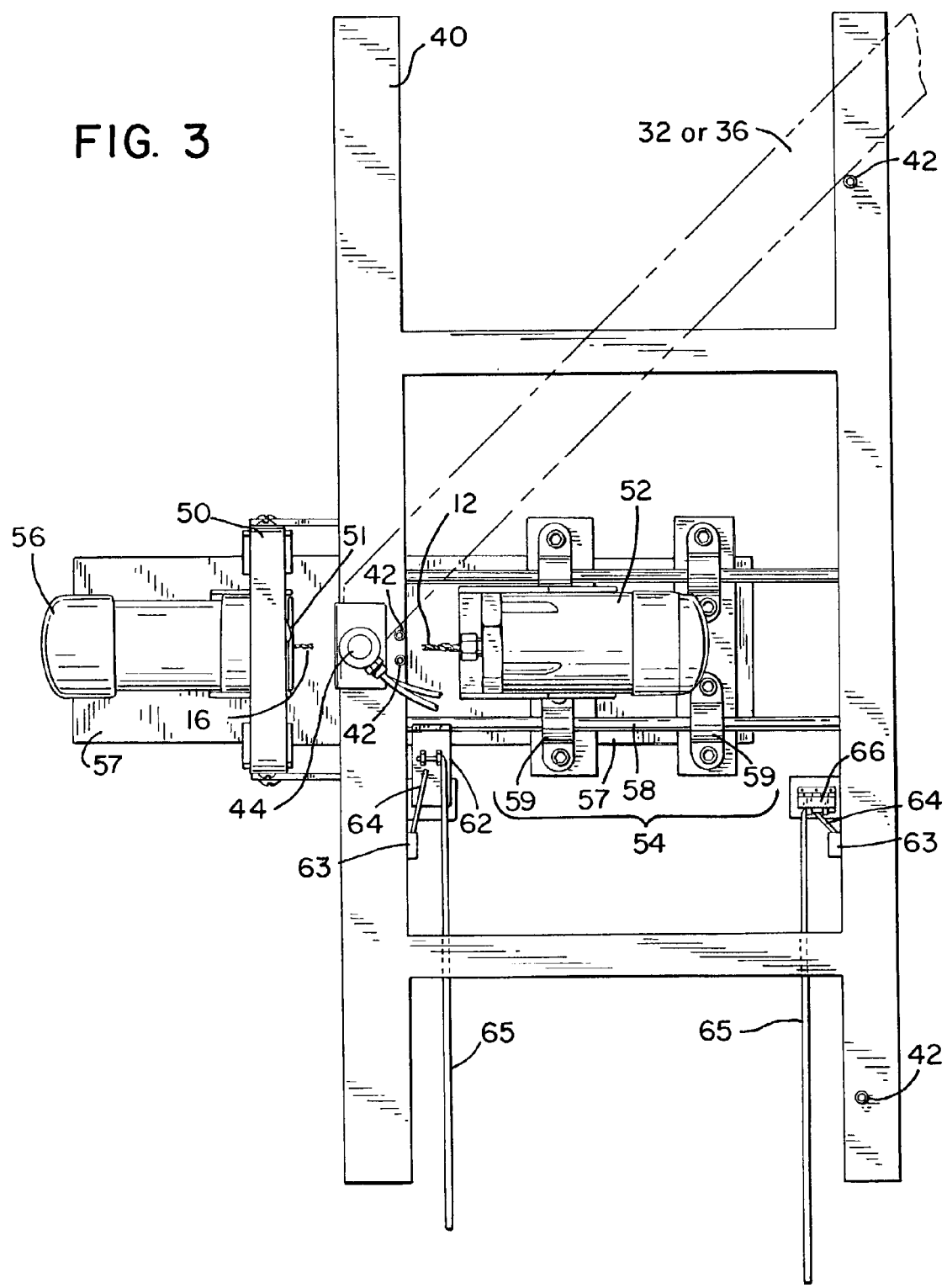
FIG. 3, shows a top schematic view of one version of the apparatus of the present invention.
Figure 4:
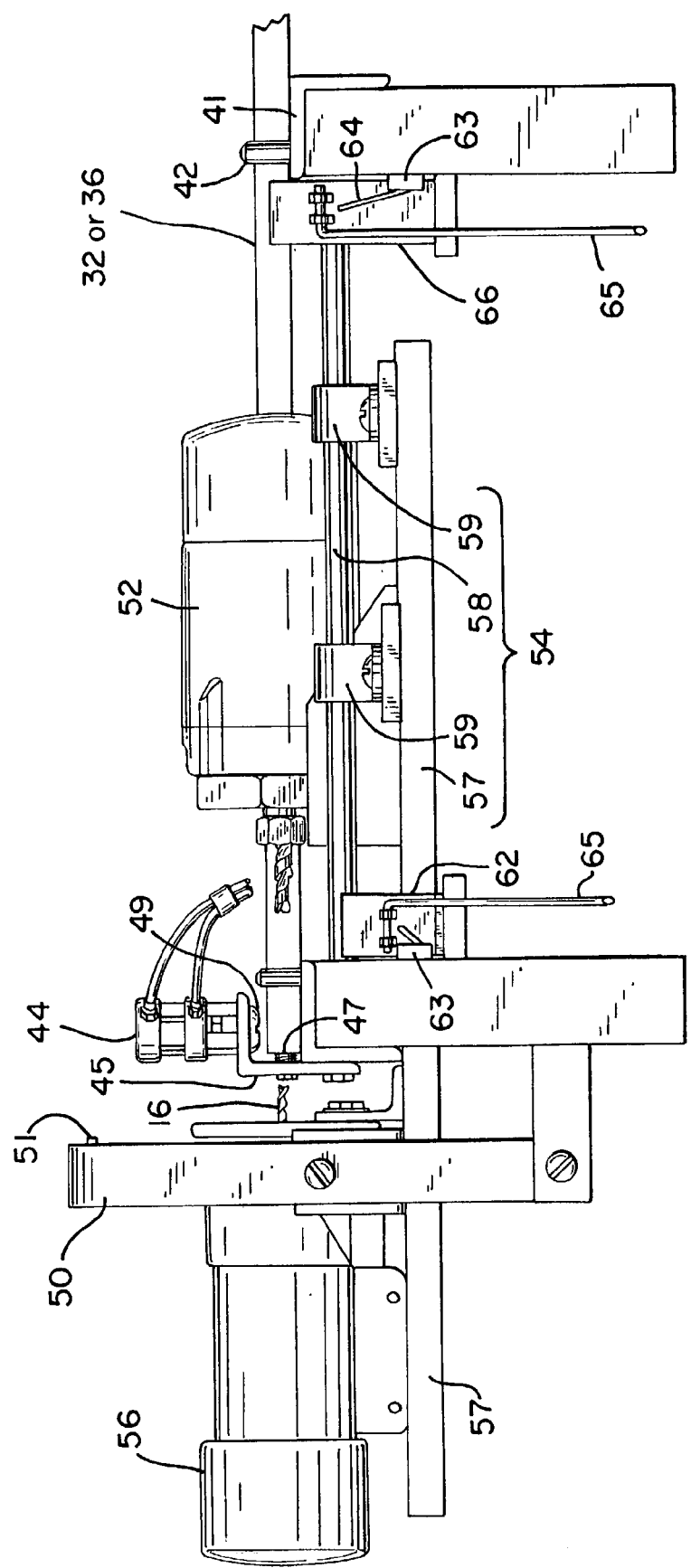
FIG. 4, shows a side schematic view of the apparatus in FIG. 3.

Referring to FIGS. 3 and 4, the apparatus consists of a first boring means 52 and a second boring means 56. Referring to FIGS. 1a and 1b, the first boring means 52 is used for boring a first screw hole 22 in the miter-cut end of the first frame member 32 along a trajectory inwardly from the outer edge 38 of the first frame member 32 and extending through to the miter-cut surface 34 so that the first screw hole 22 has a centerline 20 in perpendicular orientation to the miter-cut surface 34 (see FIGS. 1a and 1b).

The first boring means 52 may generally consist of a drilling device with associated bit 12 or similar revolving vertical spindle and cutter capable of milling out the surface of wood. The bit 12 ideally revolves at a sufficient speed (rpm) so as to not only bore the first screw hole 22 quickly, but also so that the bit 12 does not veer with the grain of the wood. The thinner the framing member 32, the more important it is to consistently bore a hole that runs true in trajectory so as not to break the surface of the frame member and so that screws 18 inserted therein will align properly with an opposing pilot screw hole 26 when the miter joint 70 is formed. The bit 12 may be made of strong materials capable of withstanding the higher rpm's and for longer wear such as steel or steel carbide.

Drilling first boring means 52 capable of achieving the necessary speed of revolution may include routers and high-speed drills. The first boring means 52 may alternatively consist of some other technology equally capable of boring the first screw hole 22, such as a laser capable of boring a screw hole by means of a laser beam or other similarly capable technology.

Referring to FIGS. 1a, 1b, 2a and 2b, alternatively to a straight-through hole, the first screw hole 22 may be a pocket hole so that the end of a screw 18 may be countersunk and hidden from view. A pocket screw hole 22 consists of a shank portion 23 and a countersink portion 24. In order to most efficiently bore a pocket screw hole 22, the bit 12, or pocket bit, would be constructed in a step design, comprising corresponding shank 13 and countersink 14 portions.

A second boring means 56 (see FIGS. 3, 4) is used to bore a pilot screw hole 26 in the miter-cut end of said second frame member 36 along a trajectory inwardly from the miter-cut surface 34 to partially penetrate the second frame member 36 so that the pilot screw hole 26 has a centerline 20 in perpendicular orientation to the miter-cut surface 34 (see FIGS. 1c–d, 2a–b).

The second boring means 56 may, similarly to the first boring means 52, generally consist of a drilling device with associated bit 16 or similar revolving vertical spindle and cutter capable of milling out the surface of wood. The bit 16 ideally revolves at a sufficient speed (rpm) so as not only to bore the pilot screw hole 26 quickly, but also so that the bit 16 does not veer with the grain of the wood.

The pilot hole 26 serves to guide the screw 18 as it exits the first screw hole 22 to penetrate the second frame member 36. The pilot hole 26 also serves to minimize damage to the second frame member 36 from a splitting of the wood, a common problem when screws 18 directly penetrate the wood without aid of a pilot hole 26. Again, with thinner frame members 36, splitting is a common problem that a pilot hole 26 tends to minimize.

Referring to FIGS. 3 and 4, the apparatus further includes a carriage assembly 54. The carriage assembly 54 consists of a moveable platform 57 upon which the first and second boring means (52 and 56) are mounted in opposing position and relative to the miter-cut surface 34 of the first or second frame member 32 or 36, so that the centerlines 20 (see FIGS. 1a to 1d) of the separately bored first and pilot screw holes (22 and 26) are in precisely opposing location and in perpendicular alignment to the miter-cut surface 34 when the first and second frame members (32 and 36) are matingly joined at the miter joint 70.

Movement of the platform 57 is linear as it is connected to the two guide rods 58 by means of several bearing assemblies 59. The carriage assembly 54 further comprises a control handle 50 in connection therewith so as to enable a user to move the platform 57 in line with and according to the path defined by the guide rods 58. The bearing assemblies 59 assure smooth movement of the platform 57 and first and second boring means (52 and 56) mounted thereon, and may contain bearings of various sorts such as linear or ball bearings or the like.

The carriage assembly 54 further comprises a first stop means 62 and a second stop means 66 each of which has an associated actuation means 65 and electrical control switch 63 (see FIGS. 3 and 4). The stop means 62 or 66 functions to restrict the movement of boring means 52 or 56 respectively, in order to enable only one or the other to bore a screw hole 22 or 26 in the frame member 32 or 36. The stop means 62 or 66 may be a simple block device as illustrated in the figures or other type of similarly functioning device.

The stop means 62 and 66 can be moved into an UP or a DOWN position by means of its associated actuation means 65. The actuation means 65 may be a pull device as illustrated in the figures or some other means similarly able to affect movement of the stop means 62 or 66.

As illustrated in FIGS. 3 and 4, stop means 62 is in the DOWN position and stop means 66 is in the UP position. When a stop means 62 or 66 is in the DOWN position it rests on guide rod 58, or is otherwise situated, so as to restrict the movement of the first or second boring means 52 or 56. As illustrated in the drawings, the stop means 62 or 66 restrict the movement of the bearing assemblies 59 and thus the platform 57 on which the boring means 52 or 56 are carried.

In normal operation of the apparatus, the stop means 62 and 66 will be in opposite positions at any one time. For example, when stop means 62 is DOWN, stop means 66 will be UP, and vice versa. Thus, only one of the boring means 52 or 56 will be able to physically reach the frame member 32 or 36 to bore a screw hole 22 or 26 at any one time.

For example, and as illustrated in FIGS. 3 and 4, when stop means 62 is in the DOWN position, the first boring means 52 cannot move forward toward the frame member sufficiently near to bore a first screw hole 22. Thus, when a second frame member 36 is in place in the apparatus, positioning stop means 62 in the DOWN position prohibits boring by the first boring means 52. As stop means 66 is simultaneously in the UP position, movement of the second boring means 56 is unrestricted and the pilot screw hole 26 may be bored.

Associated with each of the stop means 62 and 66 are control switches 63 that are connected to boring means 52 or 56. The switches are connected to the stop means 62 or 66 by means of pin elements 64 that control whether the control switch 63 associated with the first or second boring means 52 or 56 is in an ON or an OFF state. When ON, the associated boring means 52 or 56 may be activated by pressing the trigger switch 51, when OFF, the associated boring means 52 or 56 may not be activated by pressing the switch 51. The pin element 64 moves in accordance with the position of the stop means 62 or 66 to open or close the stop's associated control switch 63, thus putting it in the ON or OFF state. The net result, is that when stop means 62 is DOWN and stop means 66 is UP, and movement of first boring means 52 is restricted, pressing the trigger switch 51 on handle 50 can only activate the second boring means 56. Likewise, when stop means 66 is DOWN and stop means 62 is UP, movement of second boring means 56 is restricted and pressing the trigger switch 51 can only activate the first boring means 52. The net result is to ensure that a user will be able to drill only either a first or pilot screw hole 22 or 26 at any one time.

The apparatus further consists of a positioning means to position the miter-cut end of the first or second frame members 32 or 36 prior to being bored (see FIGS. 3 and 4). The positioning means consists of a frame support 40, clamp means 44, guide means 42 and frame stop 47.

The frame support 40 connects the positioning means to the guide rods 58 of the carriage assembly 54, and supports the back surface 35 of the first or second frame members 32 or 36 positioned thereon.

The moveable clamp means 44 maintains the alignment of the frame member 32 or 36 during boring, the clamp means 44 being mounted on a clamp plate 45 which is in turn attached to the frame support 40.

The clamp plate 45 is generally oriented perpendicularly to the axis of the boring trajectories of the first and second boring means (52 and 56) and generally parallel to the miter-cut surface 34 of the frame members 32 or 36 when positioned for boring. An aperture 46 is sized and positioned in the clamp plate 45 so as to enable passage of the second boring means 56 [i.e. the pilot bit 16 when the second boring means 56 is a drilling device (see FIGS. 1c–d), or alternatively a laser beam if the second boring means 56 employs same].

The clamp means 44 comprises a resilient clamping pad 49 which, when lowered contacts the front surface 33 of frame member 32 or 36 to securely hold the miter-cut end of the frame member in place with its back surface 35 pressed against the frame support 40 during boring.

Figure 5:
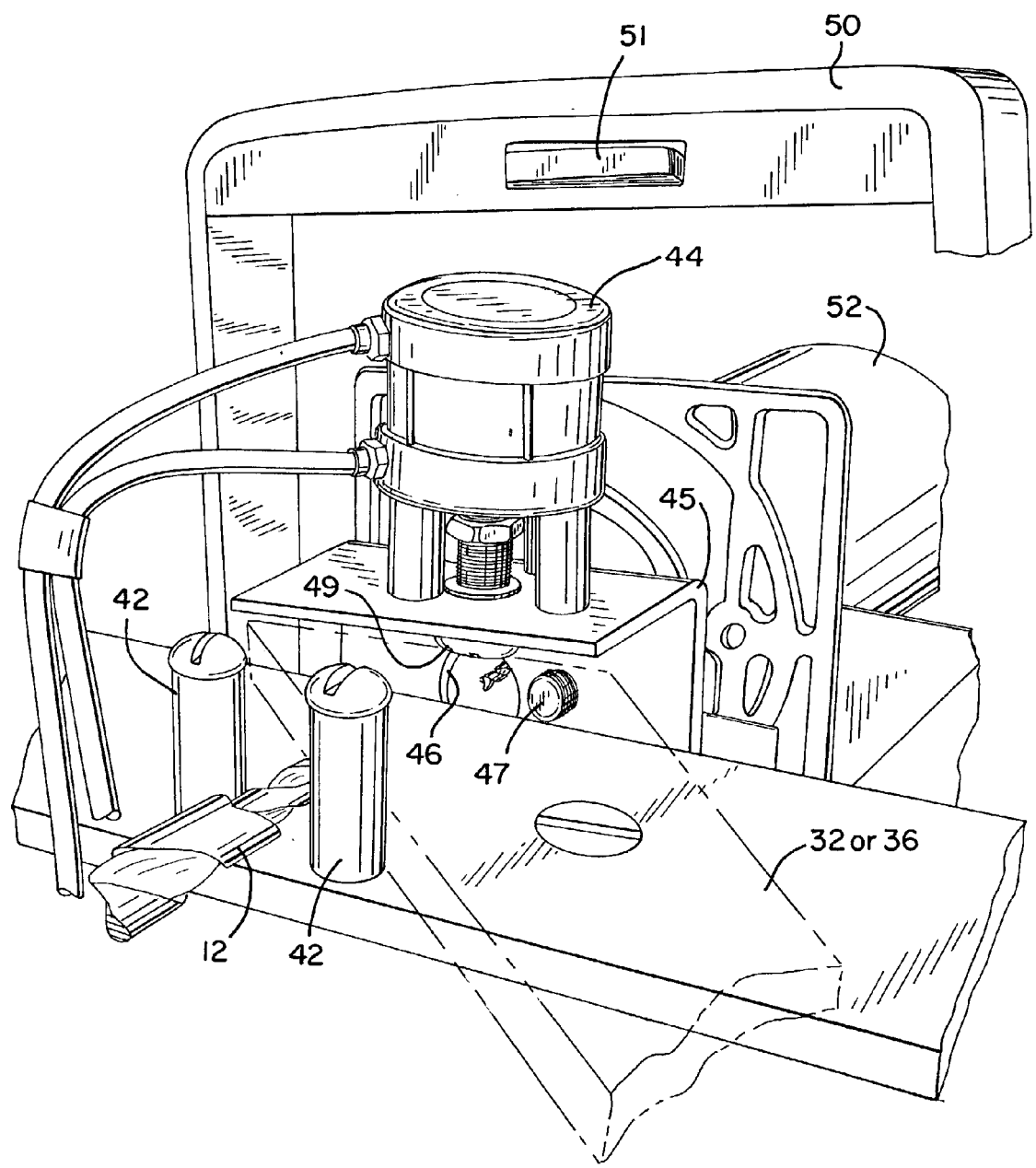
FIG. 5, shows a close-up frontal view from the side of one version of the clamp and positioning means.

The clamp means 44 may be manually operated, pneumatic (as illustrated in FIGS. 3–5) or of other types. In any case, when activated, the clamping pad 49 is lowered to hold the frame member 32 or 36 in place. If pneumatically controlled, the clamping means 44 will further comprise an attachment means 48 for compressed air (see FIGS. 6 and 7). A pneumatic clamp means 44, enables further automation of the process and fewer parts that a user must manually activate when using the apparatus.

The guide means 42 is attached to the frame support 40. With the back surface resting on the frame support 40, the outer edge 38 of the frame member 32 or 36 is positioned against the guide means 42. The guide means 42 may consist of a series of guide pins (see FIGS. 3–7) or similarly functioning structures that serve to guide the frame member 32 or 36 as it is inserted into the apparatus for placement prior to boring. The guide means 42 are situated so that a frame member 32 or 36 may be positioned for boring at either of its ends (see FIGS. 1a–1d, 3). Thus insertion of a frame member 32 or 36 for boring of either of its miter-cut ends will result in the boring of a screw hole 22 or 26 in precisely the same position relative to the corner 39 and to the back surface 35 of the miter-cut end.

The frame stop 47 mounted to and extending outwardly from the clamp plate 45 (see FIGS. 1a–d, 5) serves, together with the guide means 42, to position the miter-cut surface 34 so that it is perpendicular to the trajectory of the first and second boring means 52 or 56, and thus also perpendicular to the centerlines 20 of the first or pilot screw holes 22 or 26 to be bored therein.

The frame stop 47 and guide means 42 on the frame support 40 will generally be pre-set to accommodate frame members 32 or 36 miter-cut to certain angles, such that all of the screw holes 22 or 26 in the miter-cut surface 34 (and oriented perpendicularly thereto) will be placed at precisely the same optimal distance in from the corner 39 and at the same distance from the back surface 35 (see FIGS. 1a–d, 2a–b for the relative location). For example, and as illustrated in the FIGS. (1a–d, 2a–b), the most common miter-cut will be at a 45 degree angle, so that the miter joint 70 will form a squared off corner of 90 degrees. However, both the guide means 42 and frame stop 47 may be alternatively positioned to accommodate frames 32 or 36 cut to non-45 degree angles, as they would be to form miter joints 70 that are not squared. This might be the case, for example, when framing something that is in the shape of a triangle, octagon or other shape with non-squared miter joints 70.

Figure 6:
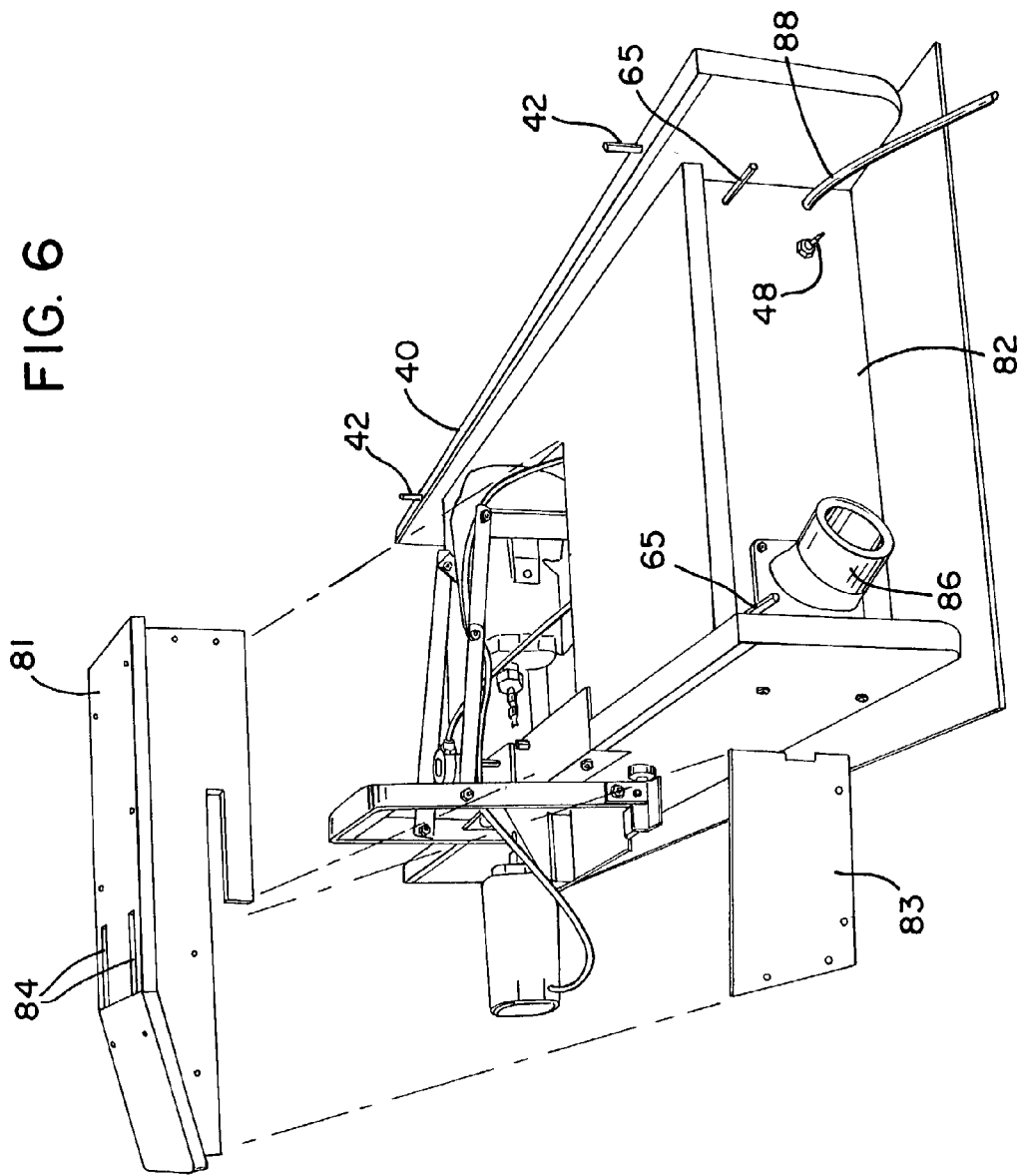
FIG. 6, shows an exploded view of one version of an enclosure.
Figure 7:
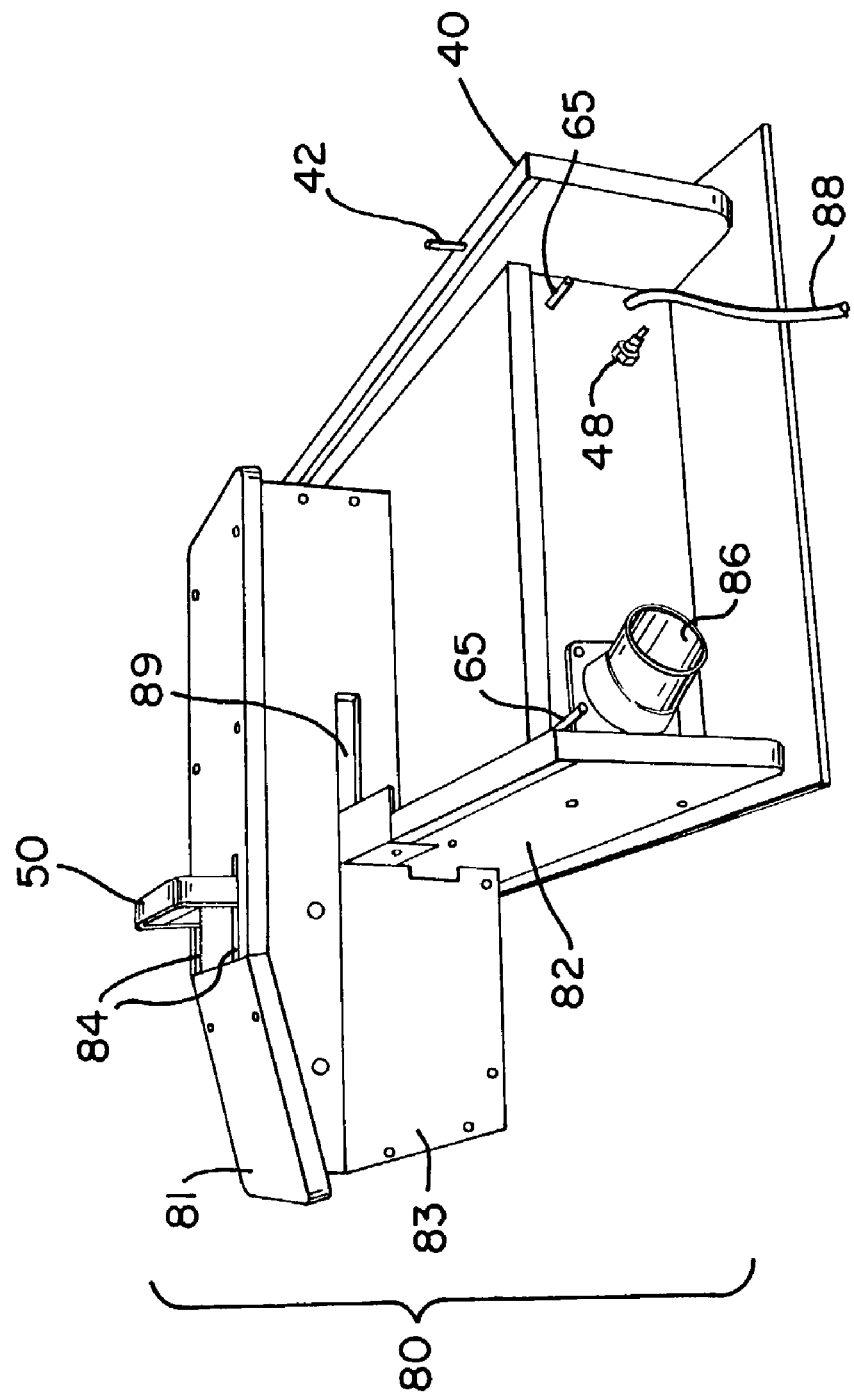
FIG. 7, shows the enclosure of FIG. 6 in place.

The apparatus may further comprise an enclosure assembly 80 to substantially enclose the boring means 52 or 56, carriage assembly 54 and positioning means. As illustrated in FIGS. 6 and 7, one version of the enclosure assembly 80 may comprise multiple parts to be fitted together in enclosing the rest of the apparatus. In FIG. 6, the parts include top 82, main 83 and bottom 84 portions. Once assembled into place (see FIG. 7), these portions 82–84 create frame member slots 89 to enable insertion of the frame members 32 or 36 and handle slots 84 to expose and to allow movement of the handle 50.

Referring to FIG. 7, vacuum attachment means 86 may also be connected to the enclosure to enable removal of the dust produced from the boring of the screw holes 22 or 26. In addition, when the clamp means 44 is pneumatic, compressed air attachment means 48 may be present on the enclosure assembly 80. A power cord 88 is also illustrated to show how electrical power may be provided to the apparatus from a power source.

By enclosing the boring means 52 or 56, carriage assembly 54 and positioning means, the enclosure assembly 80 functions to increase the safety of the user and decrease noise and dust levels when in use. Once quality boring means 52 and 56 with strong bits 12 and 16 (if bits are used) are in place, the apparatus can function for long periods of time without the need for a user to open the enclosing assembly 80.

DETAILED DESCRIPTION—METHOD

A user may employ the above-described apparatus to rapidly and efficiently bore precisely and consistently located screw holes 22 or 26 in frame members 32 or 36 individually. The frame members 32 or 36 are pre-cut to form at least one miter-cut end into which will be bored a screw hole 22 or 26.

To bore a first frame member 32, the miter-cut end of the first frame member 32 is positioned in the apparatus so that the miter-cut end is located properly. To do this, the user positons the back surface of the frame member 32 or 36 on the frame support 40 with the outer edge surface 38 positioned against the guide means 42. The user then slides the outer edge 38 of the frame member 32 along the guide means 42 until its miter-cut surface 34 abuts the frame stop 47 (see FIGS. 1a,b, and 3). In that position, the miter-cut surface 34 is in perpendicular orientation to the trajectory of bore of the first boring means 52 and to the centerline 20 of the first screw hole 22. The clamp means 44 is activated so that the clamping pad 49 presses against the first frame member 32 to hold it securely in place. When the clamp means 44 is pneumatic, it is automatically activated to hold the frame member 32 or 36 in place when the trigger switch 51 is activated.

The actuation means 65 are used to orient stop means 62 in the UP position and stop means 66 in the DOWN position, thus enabling full movement and electrical activation of the first boring means 52 and restricting movement and activation of the second boring means 56. The user then moves the control handle 50 so that the first boring means 52 approaches and contacts the first frame member 32 while simultaneously pressing the trigger switch 51 to activate the first boring means 52 and the clamp means 44 (when non-manual). Once the first screw hole 22 is made, the user reverses movement of the handle 50 so that the first boring means (and associated bit 12) are removed from the hole 22, and releases the trigger switch 51 to turn off the first boring means 52 and to release the clamping pad 49. The bored frame member 32 is then removed and replaced by another to be drilled.

To bore a second frame member 56, it is positioned as described above and a similar process is employed to activate the second boring means 56 so that the pilot hole 26 is bored. The stop means 62 is oriented in the DOWN position and the stop means 66 is placed in the UP position. Thus movement of the first boring means 52 is restricted, while that of the second boring means 56 is not. The second boring means 56 is activated by the trigger switch 51, while the first boring means 52 is not. Thus the user is able to activate and move the second boring means 56 forward to bore the pilot screw hole 26.

This process of repetitively drilling frame members of one type is a very efficient way of rapidly preparing many first or second frame members 32 or 36. All first frame members 32 may be bored at once, then all second frame members 36, eliminating the need to manipulate the stop means 62 or 66 between frame members. Additionally, all of one end of a frame member can be drilled at once, then the other. For example, if first frame members 32 have two miter-cut ends, a left and a right, all of the left ends can be bored first by inserting them individually on one side of the apparatus. Then all of the right ends can be drilled by inserting them individually on the other side of the apparatus.

Once the first and second frame members 32 and 36 are prepared, the user can pick and choose among them to match wood color and grain prior to assembling the frame members into a completed frame. For example, if the first frame members 32 are to be the tops and bottoms of window casings, and the second frame members 36 are to be the right and left sides, a user can choose from among all the left and right sides, tops and bottoms until the user is satisfied that all sides match well in wood color and grain. The matching frame members 32 and 36 can then be distributed as a set for assembly later at another site or pre-assembled by screwing them together to form the miter joints before distribution. Being able to perform this matching step by choosing among already bored frame members greatly reduces the time the user must spend when compared to matching the frame members prior to boring.

When an enclosure assembly 80 is included (see FIGS. 6 and 7), the user simply inserts a frame member 32 or 36 through the frame slots 89. The frame support 40, guide means 42 (some internal and some external to the enclosure 80) and frame stop 47 function to automatically position the frame member properly for boring. The user need simply insert the frame member 32 or 36 until it firmly abuts the frame stop 47.

The stop actuation means 65 (shown as pulls in FIGS. 6 and 7) extend outside the enclosure assembly 80 and are easily manipulated to position stop means 62 and 66 properly. Likewise, the handle 50 with trigger switch 51 also extend outside the enclosure 80 so that they are easily manipulated by the user.

The enclosure assembly 80 will generally remain closed for long periods of time. However, if a user needs to replace a bit 12 or 16, to repair a boring means 52 or 56 or the like, the user simply disassembles the enclosure to do so, reassembling it once done. Vacuum means may be attached at the vacuum attachment means 86. Likewise, when the clamping means 44 is pneumatic, compressed air lines may be attached at the compressed air attachment means 48.

ADVANTAGES OF THE INVENTION

The previously described versions of the present invention have many advantages, including (a) to provide an apparatus and method by which precisely and consistently true and aligned mating first and pilot screw holes may be individually made in separate frame members so as to enable the interchangeability of mating frame members, to maximize the quality and cost-efficiency of their production and so as to eliminate the need to align frame members at a miter joint prior to boring the screw holes; (b) to provide an apparatus and method by which precisely located screw holes can be made in frame members of varying widths; (c) to provide an apparatus and method by which precisely located screw holes can be made efficiently in individual frame members of longer lengths, such as those used in making the casings for windows and doors, that cannot practically be mated at a miter joint prior to boring; (d) to provide an apparatus and method that is simple and reliable to use so that it can be used productively, cost-effectively and safely by relatively unskilled labor; (e) to provide a method that enables a user to rapidly and separately prepare multiple top, bottom and side frame members from which to choose later when wood color and grain must be matched prior to final assembly of mitered joints, in order to minimize overall time spent and to maximize the quality of product and profitability in today's construction industry; and, (f) to provide an apparatus and method for producing frame members off-site of construction that are capable of replacing frame members lost or damaged on-site without the need to use the opposing frame member(s).

The present invention does not require that all the advantageous features and all the advantages need to be incorporated into every embodiment thereof. Therefore, the spirit and scope of the appended claims should not be limited to the description of the preferred versions contained herein.

What is claimed is:

1. An apparatus for separately boring precisely aligned opposing screw holes in individual first and second frame members to be matingly joined at a miter joint, each frame member comprising a front, back, inner edge and outer edge surface, said inner and outer edge surfaces being substantially narrower than said front and back surfaces, and the back surface being substantially flat, each frame member further comprising two ends at least one of which is cut at an angle to form a miter-cut end with a miter-cut surface in acute angle to the outer edge surface at a corner where the two surfaces meet, the apparatus comprising:

(a) a first boring means for boring a first screw hole in the miter-cut end of said first frame member;

(b) a second boring means for boring a pilot screw hole in the miter-cut end of said second frame member;

(c) a carriage assembly on which said first and second boring means are mounted and positioned relative to the miter-cut end of said first or second frame member so that said separately bored first and pilot screw holes share a common centerline to assure a precisely opposing location and a perpendicular alignment of said holes relative to the miter-cut surface when the first and second frame members are matingly joined at the miter joint; and, (d) positioning means connected to said carriage assembly for supporting and precisely positioning the miter-cut end of said individual first or second frame member in a repetitively consistent location relative to the corner, to the back surface and to the miter-cut surface of the frame member and to the first and second boring means to ensure that the first screw holes are identically located and aligned on each of the bored first frame members and that the pilot screw holes are identically located and aligned on each of the bored second frame members;

whereby said individual first and second frame members may be efficiently prepared with consistently and precisely located and aligned opposing first and pilot screw holes to assure a perfect mating when any first frame member is joined with any second frame member at the miter joint, thus enabling the interchangeability of all first and all second frame members and eliminating the need to custom bore the first and pilot screw holes through two opposing frame members simultaneously.

2. The apparatus of claim 1, wherein said first boring means further comprises a bit, the bit comprising a shank portion and a countersink portion and wherein the first screw hole is a pocket hole.

3. The apparatus of claim 1, wherein said first boring means comprises a router and wherein the second boring means comprises a router.

4. The apparatus of claim 1, wherein the first and second boring means are mounted on said carriage assembly in opposition to one another.

5. The apparatus of claim 1, further comprising an enclosure to substantially enclose the carriage assembly and positioning means.

6. The apparatus of claim 1, wherein the carriage assembly further comprises a first stop means and a second stop means for restricting movement of the first boring means and the second boring means, respectively.

7. The apparatus of claim 6, wherein a first control switch is connected by means of a pin element to the first stop means and a second control switch is connected by means of a pin element to the second stop means for alternatively activating or deactivating the first and second boring means.

8. An apparatus for separately boring precisely aligned opposing screw holes in individual first and second frame members to be matingly joined at a miter joint, each frame member comprising a front, back, inner edge and outer edge surface, said inner and outer edge surfaces being substantially narrower than said front and back surfaces, and the back surface being substantially flat, each frame member further comprising two ends at least one of which is cut at an angle to form a miter-cut end with a miter-cut surface in acute angle to the outer edge surface at a corner where the two surfaces meet, the apparatus comprising:

(a) a first boring means for boring a first screw hole in the miter-cut end of said first frame member along a trajectory inwardly from the outer edge of said first frame member and extending through to the miter-cut surface so that the first screw hole has a centerline in perpendicular orientation to said miter-cut surface;

(b) a second boring means for boring a pilot screw hole in the miter-cut end of said second frame member along a trajectory inwardly from the miter-cut surface to partially penetrate said second frame member so that the pilot screw hole has a centerline in perpendicular orientation to said miter-cut surface;

(c) a carriage assembly comprising:
a linearly moveable platform upon which said first and second boring means are mounted in opposing position and relative to the miter-cut surface of said first or second frame member so that the centerlines of said separately bored first and pilot screw holes are in precisely opposing location and in perpendicular alignment to the miter-cut surface when the first and second frame members are matingly joined at the miter joint;
two guide rods;
a plurality of bearing assemblies connecting said platform to said guide rods, said bearings enabling the smooth movement of said platform along the linear path defined by the guide rods; and,
a control handle for controlling movement of the platform and boring means mounted thereon;

(d) positioning means connected to the guide rods of said carriage assembly for supporting and precisely positioning the miter-cut end of said individual first or second frame member in a repetitively consistent location relative to the first and second boring means so that the corner and the back surface of the first or second frame member is precisely located and the miter-cut surface is at a perpendicular orientation relative to the screw hole trajectory of the first or second boring means;

whereby said individual first and second frame members may be efficiently prepared with consistently and precisely located and aligned opposing first and pilot screw holes to assure a perfect mating when any first frame member is joined with any second frame member at the miter joint, thus enabling the interchangeability of all first and all second frame members and eliminating the need to custom bore the first and pilot screw holes through two opposing frame members simultaneously.

9. The apparatus of claim 8, wherein said first boring means further comprises a bit, the bit comprising a shank portion and a countersink portion and wherein the first screw hole is a pocket hole.

10. The apparatus of claim 8, wherein said first boring means comprises a router and wherein the second boring means comprises a router.

11. The apparatus of claim 8, wherein the control handle has mounted thereon a trigger switch to activate said first or second boring means.

12. The apparatus of claim 8, further comprising an enclosure to substantially enclose the carriage assembly and positioning means.

13. The apparatus of claim 8, wherein the carriage assembly further comprises a first stop means and a second stop means for restricting movement of the first boring means and the second boring means, respectively.

14. The apparatus of claim 13, wherein a first control switch is connected by means of a pin element to the first stop means and a second control switch is connected by means of a pin element to the second stop means for alternatively activating or deactivating the first and second boring means.

15. An apparatus for separately boring precisely aligned opposing screw holes in individual first and second frame members to be matingly joined at a miter joint, each frame member comprising a front, back, inner edge and outer edge surface, said inner and outer edge surfaces being substantially narrower than said front and back surfaces, and the back surface being substantially flat, each frame member further comprising two ends at least one of which is cut at an angle to form a miter-cut end with a miter-cut surface in acute angle to the outer edge surface at a corner where the two surfaces meet, the apparatus comprising:

(a) a first boring means for boring a first screw hole in the miter-cut end of said first frame member along a trajectory inwardly from the outer edge of said first frame member and extending through to the miter-cut surface so that the first screw hole has a centerline in perpendicular orientation to said miter-cut surface;

(b) a second boring means for boring a pilot screw hole in the miter-cut end of said second frame member along a trajectory inwardly from the miter-cut surface to partially penetrate said second frame member so that the pilot screw hole has a centerline in perpendicular orientation to said miter-cut surface;

(c) a carriage assembly comprising:
a linearly moveable platform upon which said first and second boring means are mounted in opposing position and relative to the miter-cut surface of said first or second frame member so that the centerlines of said separately bored first and pilot screw holes are in precisely opposing location and in perpendicular alignment to the miter-cut surface when the first and second frame members are matingly joined at the miter joint;
two guide rods;
a plurality of bearing assemblies connecting said platform to said guide rods, said bearings enabling the smooth movement of said platform along the linear path defined by the guide rods; and,
a control handle for controlling movement of the platform and boring means mounted thereon; and, (d) positioning means comprising:
a frame support connecting the positioning means to the guide rods of the carriage assembly, and on which the back surface of the first or second frame member is positioned;

clamp means for maintaining the alignment of the frame member during boring, the clamp means being mounted on a clamp plate attached to said frame support;

guide means attached to said frame support and against which the outer edge of the frame member is positioned;

a frame stop means mounted to and extending outwardly from the clamp plate and against which the first or second frame member is abutted once guided into position along the guide means so that the corner and the back surface of the first or second frame member is precisely located and the miter-cut surface is at a perpendicular orientation relative to the screw hole trajectory of the first or second boring means;

whereby said individual first and second frame members may be efficiently prepared with consistently and precisely located and aligned opposing first and pilot screw holes to assure a perfect mating when any first frame member is joined with any second frame member at the miter joint, thus enabling the interchangeability of all first and all second frame members and eliminating the need to custom bore the first and pilot screw holes through two opposing frame members simultaneously.

16. The apparatus of claim 15, wherein said first boring means further comprises a bit, the bit comprising a shank portion and a countersink portion and wherein the first screw hole is a pocket hole.

17. The apparatus of claim 15, wherein said first boring means comprises a router and wherein the second boring means comprises a router.

18. The apparatus of claim 15, wherein the control handle has mounted thereon a trigger switch to activate said first or second boring means.

19. The apparatus of claim 15, further comprising an enclosure to substantially enclose the carriage assembly and positioning means.

20. The apparatus of claim 15, wherein the carriage assembly further comprises a first stop means and a second stop means for restricting movement of the first boring means and the second boring means, respectively.

21. The apparatus of claim 20, wherein a first control switch is connected by means of a pin element to the first stop means and a second control switch is connected by means of a pin element to the second stop means for alternatively activating or deactivating the first and second boring means.

22. A method for separately boring precisely aligned opposing screw holes in individual first and second frame members to be matingly joined at a miter joint, each frame member comprising a front, back, inner edge and outer edge surface, said inner and outer edge surfaces being substantially narrower than said front and back surfaces, and the back surface being substantially flat, each frame member further comprising two ends at least one of which is cut at an angle to form a miter-cut end with a miter-cut surface in acute angle to the outer edge surface at a corner where the two surfaces meet, the method comprising:

(a) providing a first boring means for boring a first screw hole in the miter-cut end of said first frame member;

(b) providing a second boring means for boring a pilot screw hole in the miter-cut end of said second frame member;

(c) providing a carriage assembly on which said first and second boring means are mounted and positioned relative to the miter-cut end of said first or second frame member so that said separately bored first and pilot screw holes share a common centerline to assure a precisely opposing location and a perpendicular alignment of said holes relative to the miter-cut surface when the first and second frame members are matingly joined at the miter joint;

(d) providing a positioning means connected to said carriage assembly for supporting and precisely positioning the miter-cut end of said individual first or second frame member in a repetitively consistent location relative to the corner, to the back surface and to the miter-cut surface of the frame member and to the first and second boring means to ensure that the first screw holes are identically located and aligned on each of the bored first frame members and that the pilot screw holes are identically located and aligned on each of the bored second frame members;

(e) if a first frame member is to be bored, using the positioning means to locate the miter-cut end of the first frame member relative to the first boring means and moving the carriage assembly so that the first boring means engages the first frame member to bore a first screw hole therein; and, (f) if a second frame member is to be bored, using the positioning means to locate and support the miter-cut end of the second frame member relative to the second boring means and moving the carriage assembly so that the second boring means engages the second frame member to bore a pilot screw hole therein;

thereby efficiently preparing said individual first and second frame members with consistently and precisely located and aligned opposing first and pilot screw holes to assure a perfect mating when any first frame member is joined with any second frame member at the miter joint, thus enabling the interchangeability of all first and all second frame members and eliminating the need to custom bore the first and pilot screw holes through two opposing frame members simultaneously.

23. A method for separately boring precisely aligned opposing screw holes in individual first and second frame members to be matingly joined at a miter joint, each frame member comprising a front, back, inner edge and outer edge surface, said inner and outer edge surfaces being substantially narrower than said front and back surfaces, and the back surface being substantially flat, each frame member further comprising two ends at least one of which is cut at an angle to form a miter-cut end with a miter-cut surface in acute angle to the outer edge surface at a corner where the two surfaces meet, the method comprising:

(a) providing a first boring means for boring a first screw hole in the miter-cut end of said first frame member along a trajectory inwardly from the outer edge of said first frame member and extending through to the miter-cut surface so that the first screw hole has a centerline in perpendicular orientation to said miter-cut surface;

(b) providing a second boring means for boring a pilot screw hole in the miter-cut end of said second frame member along a trajectory inwardly from the miter-cut surface to partially penetrate said second frame member so that the pilot screw hole has a centerline in perpendicular orientation to said miter-cut surface;

(c) providing a carriage assembly comprising:
  providing a linearly moveable platform upon which said first and second boring means are mounted in opposing position and relative to the miter-cut surface of said first or second frame member so that the centerlines of said separately bored first and pilot screw holes are in precisely opposing location and in perpendicular alignment to the miter-cut surface when the first and second frame members are matingly joined at the miter joint;
  providing two guide rods;
  providing a plurality of bearing assemblies connecting said platform to said guide rods, said bearings enabling the smooth movement of said platform along the linear path defined by the guide rods; and,
  providing a control handle for controlling movement of the platform and boring means mounted thereon;
(d) providing positioning means connected to the guide rods of said carriage assembly for supporting and precisely positioning the miter-cut end of said individual first or second frame member in a repetitively consistent location relative to the first and second boring means so that the corner and back surface of the first or second frame member is precisely located and the miter-cut surface is at a perpendicular orientation relative to the screw hole trajectory of the first or second boring means;
(e) if a first frame member is to be bored, using the positioning means to locate the miter-cut end of the first frame member relative to the trajectory of the first boring means and moving the carriage assembly by means of the control handle so that the first boring means engages the first frame member to bore the first screw hole therein;
(f) if a second frame member is to be bored, using the positioning means to locate and support the miter-cut end of the second frame member relative to the trajectory of the second boring means and moving the carriage assembly by means of the control handle so that the second boring means engages the second frame member to bore the pilot screw hole therein;
thereby efficiently preparing said individual first and second frame members with consistently and precisely located and aligned opposing first and pilot screw holes to assure a perfect mating when any first frame member is joined with any second frame member at the miter joint, thus enabling the interchangeability of all first and all second frame members and eliminating the need to custom bore the first and pilot screw holes through two opposing frame members simultaneously.

24. A method for separately boring precisely aligned opposing screw holes in individual first and second frame members to be matingly joined at a miter joint, each frame member comprising a front, back, inner edge and outer edge surface, said inner and outer edge surfaces being substantially narrower than said front and back surfaces, and the back surface being substantially flat, each frame member further comprising two ends at least one of which is cut at an angle to form a miter-cut end with a miter-cut surface in acute angle to the outer edge surface at a corner where the two surfaces meet, the method comprising:

(a) providing a first boring means for boring a first screw hole in the miter-cut end of said first frame member along a trajectory inwardly from the outer edge of said first frame member and extending through to the miter-cut surface so that the first screw hole has a centerline in perpendicular orientation to said miter-cut surface;
(b) providing a second boring means for boring a pilot screw hole in the miter-cut end of said second frame member along a trajectory inwardly from the miter-cut surface to partially penetrate said second frame member so that the pilot screw hole has a centerline in perpendicular orientation to said miter-cut surface;
(c) providing a carriage assembly comprising:
  providing a linearly moveable platform upon which said first and second boring means are mounted in opposing position and relative to the miter-cut surface of said first or second frame member so that the centerlines of said separately bored first and pilot screw holes are in precisely opposing location and in perpendicular alignment to the miter-cut surface when the first and second frame members are matingly joined at the miter joint;
  providing two guide rods;
  providing a plurality of bearing assemblies connecting said platform to said guide rods, said bearings enabling the smooth movement of said platform along the linear path defined by the guide rods; and,
  providing a control handle for controlling movement of the platform and boring means mounted thereon; and,
(d) providing positioning means comprising:
  providing a frame support connecting the positioning means to the guide rods of the carriage assembly, and on which the back surface of the first or second frame member is positioned;
  providing clamp means for maintaining the alignment of the frame member during boring, the clamp means being mounted on a clamp plate attached to said frame support;
  providing guide means attached to said frame support and against which the outer edge of the frame member is positioned;
  providing a frame stop means mounted to and extending outwardly from the clamp plate and against which the first or second frame member is abutted once guided into position along the guide means so that the corner and back surface of the first or second frame member is precisely located and the miter-cut surface is at a perpendicular orientation relative to the screw hole trajectory of the first or second boring means;
(e) if a first frame member is to be bored,
  locating the miter-cut end of the first frame member relative to the trajectory of the first boring means by sliding the outer edge of said frame member along the guide means and abutting the miter-cut surface thereof against the frame stop; and,
  moving the carriage assembly by means of the control handle so that the first boring means engages the first frame member to bore the first screw hole therein;
(f) if a second frame member is to be bored,
  locating the miter-cut end of the second frame member relative to the trajectory of the second boring means by sliding the outer edge of said frame member along the guide means and abutting the miter-cut surface thereof against the frame stop; and, moving the carriage assembly by means of the control handle so that the second boring means engages the second frame member to bore the pilot screw hole therein;

thereby efficiently preparing said individual first and second frame members with consistently and precisely located and aligned opposing first and pilot screw holes to assure a perfect mating when any first frame member is joined with any second frame member at the miter joint, thus enabling the interchangeability of all first and all second frame members and eliminating the need to custom bore the first and pilot screw holes through two opposing frame members simultaneously.

25. The method of claim 24, wherein the carriage assembly further comprises a first stop means and a second stop means for restricting movement of the first boring means and the second boring means, respectively.

26. The method of claim 25, wherein a first control switch is connected by means of a pin element to the first stop means and a second control switch is connected by means of a pin element to the second stop means for alternatively activating or deactivating the first and second boring means.

* * * * *